United States Patent
Fayyad et al.

[11] Patent Number: 5,916,289
[45] Date of Patent: Jun. 29, 1999

[54] ARMING METHOD AND APPARATUS FOR SUPPLEMENTAL INFLATABLE RESTRAINT SYSTEM

[75] Inventors: Salem Ahmad Fayyad, Kokomo; Sheri Lynn Patterson, Greentown; Troy Allen Wideman; James Jacob Riling, both of Kokomo, all of Ind.

[73] Assignee: Delco Electronics Corp., Kokomo, Ind.

[21] Appl. No.: 08/797,069

[22] Filed: Feb. 10, 1997

[51] Int. Cl.$^6$ .................................................. B60R 21/32
[52] U.S. Cl. .......................... 701/45; 701/46; 280/734; 280/735; 280/730; 180/232; 180/271; 180/282; 364/424; 340/436; 340/903
[58] Field of Search ........................ 701/45, 46; 180/232, 180/271, 282; 280/734, 735, 730; 364/424; 340/436, 903

[56] References Cited

U.S. PATENT DOCUMENTS

| | | | |
|---|---|---|---|
| 5,309,030 | 5/1994 | Schultz | 307/10.1 |
| 5,320,383 | 6/1994 | Chan et al. | 280/735 |
| 5,420,790 | 5/1995 | Ravas, Jr. et al. | 364/424.05 |
| 5,432,385 | 7/1995 | Kincaid et al. | 307/10.1 |
| 5,461,567 | 10/1995 | Kelley et al. | 364/424.05 |
| 5,620,202 | 4/1997 | Gray et al. | 280/735 |
| 5,732,375 | 3/1998 | Cashler | 701/45 |
| 5,826,902 | 10/1998 | Foo et al. | 280/735 |
| 5,845,729 | 12/1998 | Smith et al. | 180/282 |

*Primary Examiner*—William A. Cuchlinski, Jr.
*Assistant Examiner*—Sean D. Saunders
*Attorney, Agent, or Firm*—Jimmy L. Funke

[57] ABSTRACT

A SIR system has frontal air bags and side air bags both controlled by the same microprocessor. To guard against spurious deployment of side air bags with minimal software burden, a lateral accelerometer and an arming circuit detect side crash activity and apply an arming signal to a pulse accumulator circuit in the microprocessor which monitors the accumulator state to detect arming, thereby inhibiting deployment when the arming signal is absent. The arming circuit receives the accelerometer signal, removes the dc component which is subject to drift, adds a fixed offset voltage and compares the resultant signal to threshold values to produce an arming signal when a threshold is breached.

11 Claims, 3 Drawing Sheets

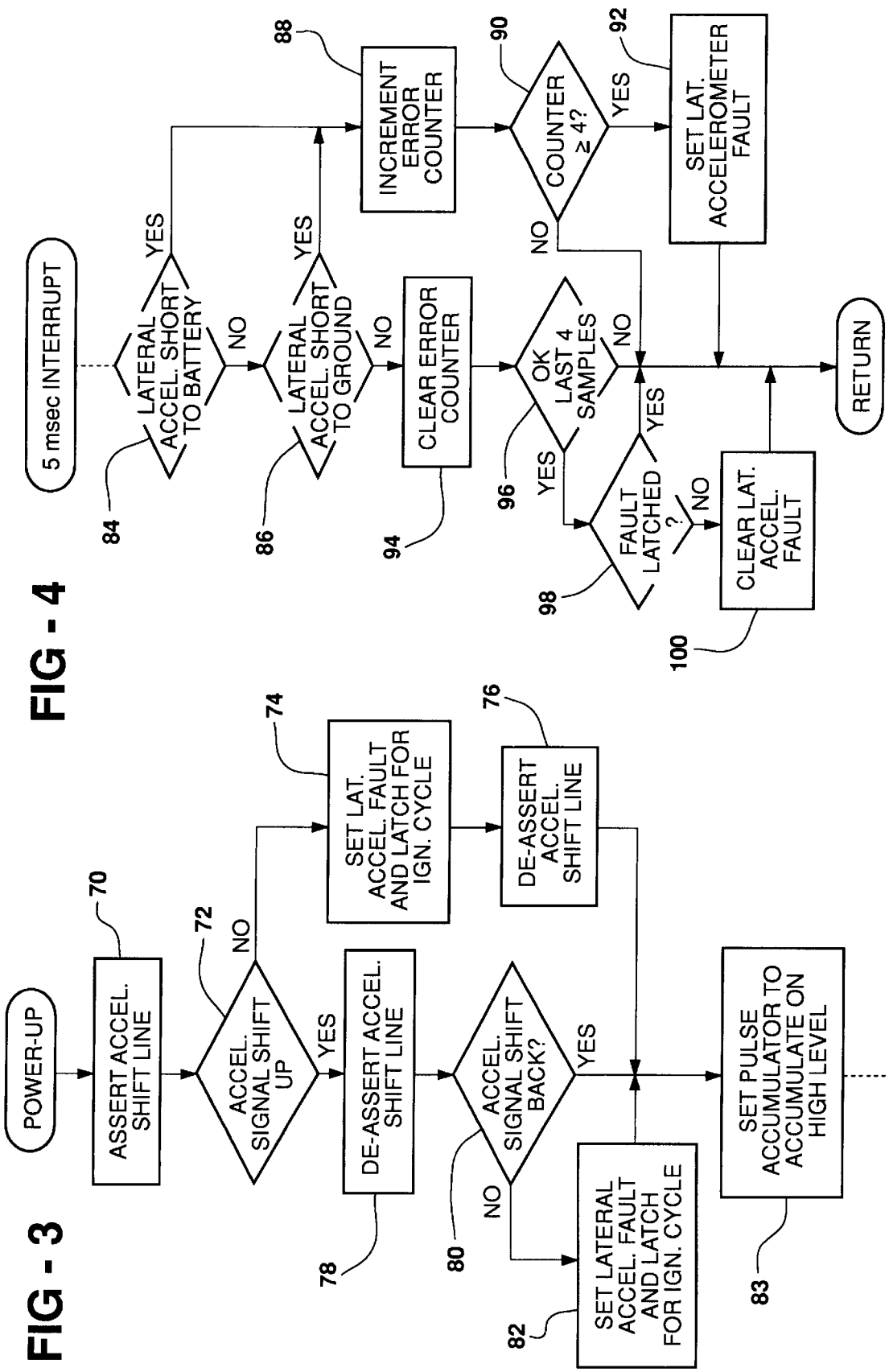

ARMING METHOD AND APPARATUS FOR SUPPLEMENTAL INFLATABLE RESTRAINT SYSTEM

FIELD OF THE INVENTION

This invention relates to supplemental inflatable restraint systems and particularly to an arming method and apparatus for verifying a crash event to permit air bag deployment.

BACKGROUND OF THE INVENTION

Supplemental inflatable restraints (SIRs) are commonly used in motor vehicles to deploy air bags in the event of a crash for occupant protection. A frontal impact sensor, typically an accelerometer, develops a signal in the event of a crash, and a microprocessor evaluates the signal to decide whether to deploy the air bags. An arming circuit independently senses the crash event to verify that a crash is in progress and inhibits deployment in the absence of crash evidence. A firing circuit responds to a deployment command from the microprocessor to cause bag inflation. Typically the bags are in front of the occupants and the impact sensor and the arming circuit are sensitive to acceleration in the longitudinal direction of the vehicle. Now side air bags are employed to protect against side impact; side impact sensors in the vehicle doors send deploy messages to the microprocessor. Another arming circuit including a lateral accelerometer sensitive to acceleration in the lateral direction of the vehicle provides an arming signal to the microprocessor.

The microprocessor uses a robust algorithm to assess the frontal impact sensor output and decides whether to deploy, and also processes the frontal arming signal as well as the side deploy messages. To maintain this level of activity and meet the demands for rapid execution of all these functions, it is desirable to avoid any significant processing burden imposed by the lateral arming circuit.

SUMMARY OF THE INVENTION

It is therefore an object of the invention to minimize the impact of a SIR arming circuit on the algorithm throughput of a SIR microprocessor.

A SIR circuit includes a microprocessor for processing signals from one or more impact sensors and from arming circuits to determine whether to command air bag deployment. An arming accelerometer produces an output according to acceleration in a particular direction, the output comprising an ac signal on a dc bias voltage which is subject to drift. A signal processing circuit filters out the dc component and then adds a fixed offset voltage to the ac component, and then compares the refined acceleration signal to hardware selectable thresholds to yield an arming signal when the acceleration exceeds a threshold.

The microprocessor includes an accumulator circuit which operates independently of the operating software, and is set to accumulate counts when the arming signal is present. When a deployment message is received or developed by the microprocessor the recent accumulator history is sampled and deployment is inhibited if there is no accumulated count and is permitted if there is a count. Diagnostic operations search for a fault in the accelerometer and disable the inhibiting function if a fault is found. These functions are invoked only infrequently and thus add only minimal software burden.

BRIEF DESCRIPTION OF THE DRAWINGS

The above and other advantages of the invention will become more apparent from the following description taken in conjunction with the accompanying drawings wherein like references refer to like parts and wherein:

FIGS. 3 and 4 are flow charts of accelerometer diagnostics used in the controller of FIG. 1;

Description of the Invention

The ensuing description is directed to an arming method and apparatus developed for use with side impact sensing, but it is not limited to that application; it will be evident that the invention applies as well to frontal Impact sensing, for example.

Figure 1:
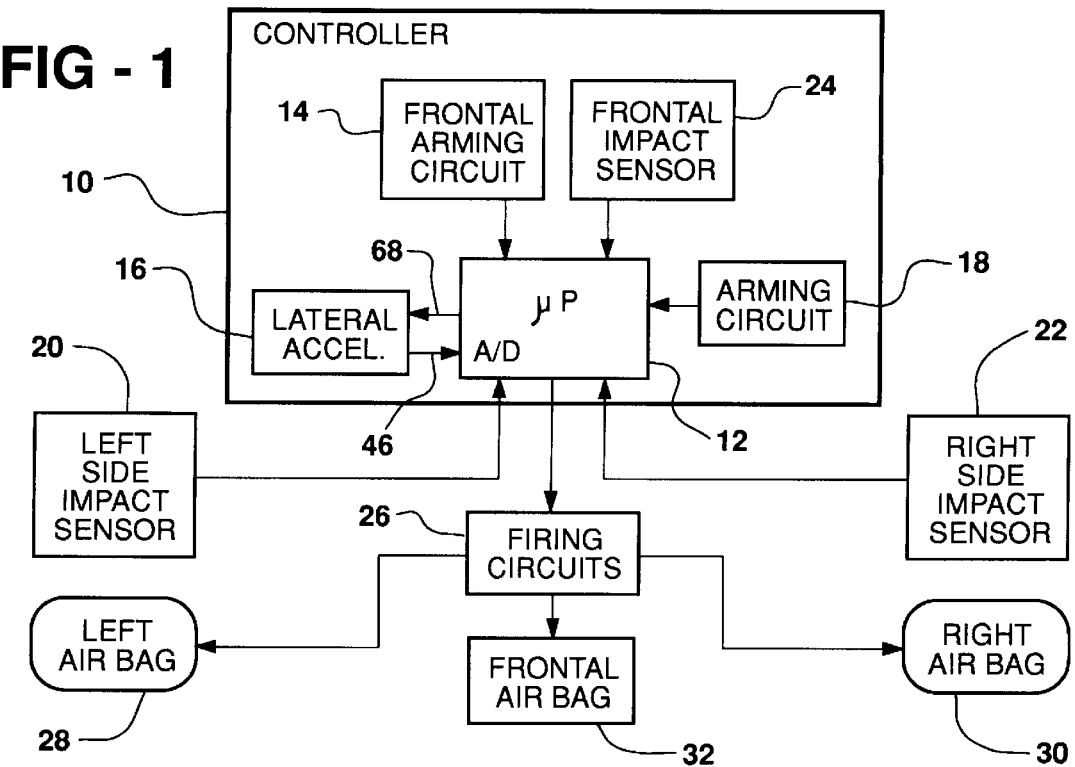
FIG. 1 is a block diagram of a SIR system according to the invention.

Referring to FIG. 1, a SIR controller 10 (or sensing and diagnostic module) includes a microprocessor 12 having inputs connected to a frontal impact sensor 24, a frontal arming circuit 14 (including a longitudinal accelerometer, not shown) a lateral accelerometer 16 and a lateral arming circuit 18, all within the controller 10. External inputs to the SIR controller 10 are a left side impact sensor 20 and a right side impact sensor 22 which are coupled via signal processing hardware, not shown, to the microprocessor 12. The microprocessor 12 has an output directed to the lateral accelerometer 16 and a deploy output coupled to firing circuits 26 which in turn are connected to the left side air bag 28, the right side air bag 30 and the frontal air bags 32 which are selectively deployed according to the deployment command issued to the firing circuit.

In operation, acceleration signals from the frontal impact sensor 24 are evaluated by an algorithm in the microprocessor 12 to recognize a crash event and to determine whether and when to deploy the frontal air bag 32. If there is a frontal crash in progress, the frontal arming circuit will issue an arming signal to the microprocessor which allows a deploy command to be issued to the firing circuits 32. If the arming sensor does not sense crash activity, the lack of an arming signal will inhibit a deploy command, thereby providing a check against a false deployment.

The left and right side impact sensors 20, 22 differ from the frontal sensor 24 in that they each contain a processor to evaluate whether to deploy a side air bag, and send a deploy message to the microprocessor 12 in the SIR controller. Then the microprocessor 12 has only to verify that the lateral arming circuit 18 permits deployment of a left or right air bag. In the event of a side impact the lateral accelerometer 16 will yield an acceleration signal which is processed by the arming circuit to yield an arming signal which is sent to an accumulator port of the microprocessor 12. An accumulator circuit in the microprocessor can then monitor the arming signal without affecting the algorithm throughput of the microprocessor.

Figure 2:
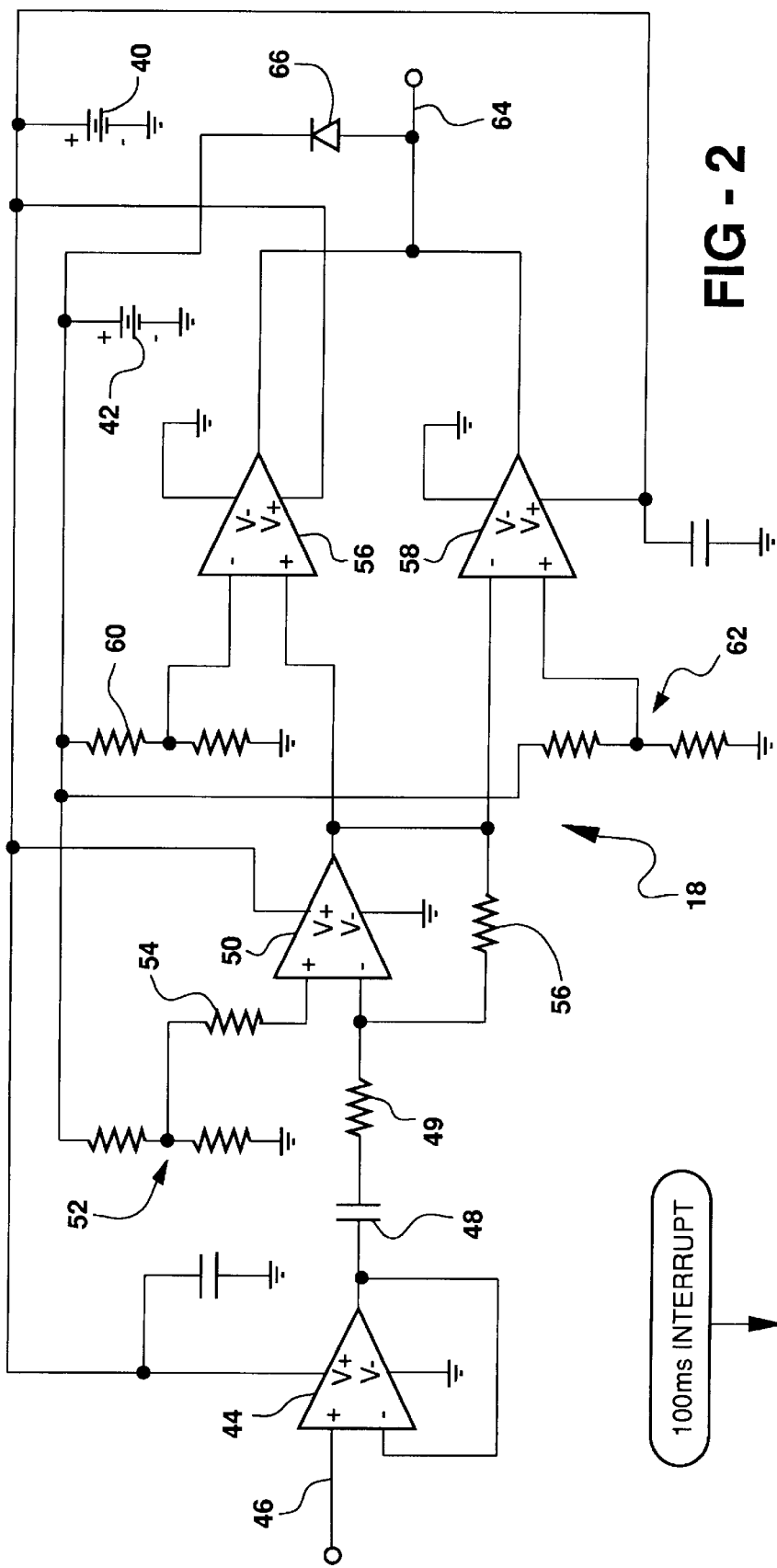
FIG. 2 is a schematic circuit diagram of an arming circuit of FIG. 1 according to the invention.

Details of the arming circuit 18 are shown in FIG. 2. A nominal 12 v source 40 (battery) supplies voltage to each operational amplifier in the circuit. A 5 v regulated source 42 supplies reference voltages to the circuit. A buffer amplifier 44 having its output coupled to its negative input is connected by its positive input to line 46 which carries a raw acceleration signal from the lateral accelerometer 16. The buffer output is coupled through a capacitor 48 and a resistor 49 to the negative input of an inverting amplifier 50. The capacitor blocks the dc component of the input signal and passes the ac component. A voltage divider 52 comprising equal value resistors is coupled between the 5 v source and ground to produce a constant 2.5 v at the resistor junction. The junction is coupled through a resistor 54 to the positive input of the amplifier 50 so that the amplifier output will be a refined acceleration signal comprising the ac component superimposed on an offset voltage of 2.5 v. The amplifier output is coupled through a feedback resistor 56 to its negative input. The amplifier 50 output is directly connected to the negative input of a comparator 56 and to the positive input of a comparator 58. The negative input of comparator 56 is connected to the junction point of a voltage divider 60 set to provide a threshold voltage slightly higher than the 2.5 v offset, and the positive input of comparator 58 is connected to the junction point of a voltage divider 62 set to provide a threshold voltage slightly lower than the 2.5 v offset. The comparator outputs are joined to provide the arming circuit output on line 64. A diode 66 coupled between the output line 64 and the 5 v source clamps the maximum output voltage to 5 v. The threshold values are selectable by choice of suitable resistors in the voltage dividers 60 and 62.

In operation, the voltage offset from the accelerometer 16, which is subject to drifting, is stripped from the signal by the capacitor 48 and a fixed offset of 2.5 v is added to the resulting ac signal by the amplifier 50. The resulting refined acceleration signal is fed to the two comparators 56, 58 which yield a ground level signal as long as the acceleration signal remains between the two threshold values and a high level signal (5 v) when a threshold is breached. This result could not reliably be attained using the raw acceleration signal because the drift in the signal offset would make the comparator function erratic or even void since the offset value itself may change enough to cross a threshold at zero acceleration. Thus the substitution of the fixed offset for the drifting offset is essential to the operation of the arming circuit.

The software for accommodating the side arming sensor 16 and circuit 18 is shown in the flow charts of FIGS. 3–6 wherein the functional description of each block in the charts is accompanied by a number in angle brackets <nn> which corresponds to the reference number of the block. FIG. 3 is a lateral accelerometer diagnostic routine which is executed upon power up of the circuitry, when vehicle ignition is turned on. As shown in FIG. 1, a line 68 from the microprocessor 12 extends to the accelerometer 16. This line is used to assert an accelerometer output shift <70>. The accelerometer circuit is normally able to respond to the assertion by shifting the output voltage up. The voltage is sensed on output line 46 which connects to an A/D port of the microprocessor. If the shift does not occur <72> a lateral accelerometer fault is set and latched for the duration of the ignition cycle <74>. Then the line 68 is de-asserted <76>. If however, the shift up does occur <72> the line is de-asserted <78> and if the accelerometer signal shifts back <80> the test is completed, but if it does not shift back the lateral accelerometer fault is set and latched for the duration of the ignition cycle <82>. Thus the initial operability of the accelerometer circuit is assured or the fault is set. Another function occurring during power-up is that the pulse accumulator circuit in the microprocessor is configured to accumulate pulses when the arming signal 64 is high <83>.

FIG. 4 shows a method of testing the accelerometer output line 46 for shorts. This occurs every 5 ms triggered by a microprocessor interrupt. If a short to battery <84> or a short to ground <86> is detected, an error counter is incremented <88> and if the count reaches four <90>, a lateral accelerometer fault is set <92>. This result requires four consecutive short detections over 15ms. If however, no short was detected the error counter is cleared <94> and if the last four samples revealed no short <96>, and the fault has not been latched <98> the fault is cleared <100>. Thus if the fault has been latched in the FIG. 3 power up routine it cannot be cleared within the ignition cycle, but if it is not latched, four consecutive-good tests is sufficient to clear a fault.

Figure 5:
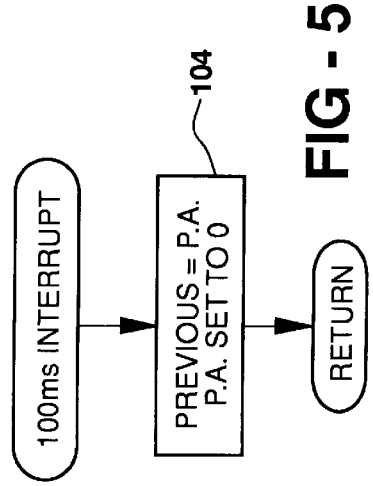
FIG. 5 is a flow chart of pulse accumulator management for the controller of FIG. 1.

Since the pulse accumulator is configured at power up to accumulate pulses when the arming signal 64 is high, there is no microprocessor activity due to monitoring the arming circuit until the arming signal occurs, except for occasional accumulator updates. As shown in FIG. 5, every 100 ms the microprocessor sets a value "Previous" to the current count (which reflects the recent history of the accumulator) and sets the accumulator count P.A. to zero <104>.

Figure 6:
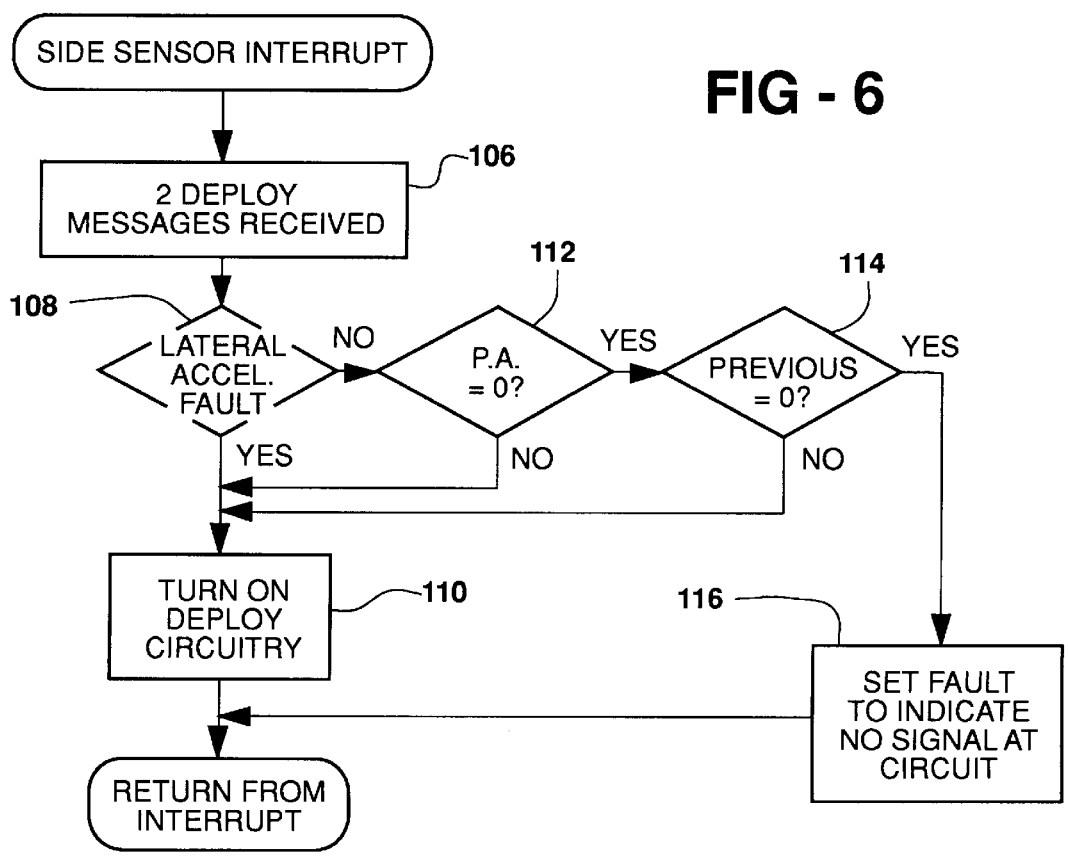
FIG. 6 is a flow chart of an arming method employed by the controller of FIG. 1.

When either side impact sensor determines that the air bag for that side should be deployed, it sends repeated deploy messages to the microprocessor 12. This causes an interrupt in the microprocessor program. As shown in FIG. 6, when two deploy messages are received <106>, the state of the lateral accelerometer fault is checked <108>. If a fault is recorded, the deploy circuitry is turned on <110>. If a fault is not recorded, the current count of the pulse accumulator is checked <112> and the Previous count is checked <114>. If either value is non-zero the deploy circuitry is turned on <110>; if both values are zero a fault is set to indicate that there is no signal at the arming circuit <116> and the deploy circuitry is not activated.

In this manner the arming circuit inhibits deployment of either side air bag when the lateral accelerometer does not sense lateral crash activity. When the lateral accelerometer is in a failure mode the inhibiting function is disabled. Since the accumulator circuit performs the continuous monitoring of the arming signal along with the 100 ms update, the monitoring requires minimal software burden, and the 5 ms interrupt for checking shorts also adds only minimal burden. The failure check at power up has no-impact on the algorithm throughput. Thus the arming function is accomplished without significantly affecting the main algorithm throughput of the microprocessor.

The same arming technique can be applied to the frontal arming sensor which usually has been wholly managed by the software. Thus the software burden can be lightened by adding the simple arming circuit and using an accumulator function of the microprocessor to monitor that arming signal.

The embodiments of the invention in which an exclusive property or privilege is claimed are defined as follows:

1. A supplemental restraint system having an air bag, an impact sensor, and a control circuit responsive to the impact sensor for determining when to deploy the air bag comprising:

an arming accelerometer for sensing impact activity and having an output;

an arming circuit coupled to the accelerometer output including means responsive to the accelerometer for producing an acceleration signal with a fixed offset, and means for detecting a predetermined variance of the acceleration signal from the offset and generating an arming output indicative of arming accelerometer activity; and a microprocessor having an accumulator circuit connected to the arming circuit for receiving the arming output and effective for accumulating counts when the arming output is present, the microprocessor being programmed to inhibit air bag deployment when the count value reflects absence of arming output that is indicative of lateral acceleration activity.

2. The invention as defined in claim 1 wherein the microprocessor includes:

means for periodically resetting the accumulator count to zero and saving the count for the previous period; and means for permitting deployment when either the current or the previous count is non-zero.

3. The invention as defined in claim 2 wherein the microprocessor includes:

an input connected to the accelerometer output;

the microprocessor being programmed to evaluate the accelerometer output to determine accelerometer failure and to permit deployment during accelerometer failure.

4. The invention as defined in claim 1 wherein the means responsive to the accelerometer for producing an acceleration signal with a fixed offset comprises;

a capacitive coupling to isolate any dc component of the accelerometer output and to pass an ac component; and an offset circuit for applying a fixed offset to the ac component.

5. The invention as defined in claim 4 wherein the means for detecting a predetermined variance of the acceleration signal from the offset and generating an output indicative of acceleration activity comprises comparator means for comparing the acceleration signal to at least one threshold and producing the output when a threshold is surpassed.

6. In a supplemental restraint system having an impact sensor coupled to a controller including an accelerometer and a microprocessor for determining whether to issue a deploy command, a method of arming the controller comprising the steps of:

sensing acceleration by the accelerometer and producing a raw acceleration signal;

filtering any dc component from the raw signal and replacing it with a fixed offset to produce a refined acceleration signal;

producing an inhibit signal when the refined acceleration signal does not exceed preset thresholds; and inhibiting airbag deployment when the inhibit signal is present, and arming the controller when the inhibit signal is absent to permit airbag deployment.

7. The invention as defined in claim 6 including:

continuously accumulating counts when the inhibit signal is absent; and wherein the inhibiting step includes sampling the counts to detect the presence of the inhibit signal.

8. The invention as defined in claim 6 including:

continuously accumulating counts when the inhibit signal is absent;

periodically setting the current count to zero and storing the previous count; and wherein the inhibiting step includes reading the current count and the previous count and detecting an inhibit signal when both counts are zero.

9. The invention as defined in claim 6 including the steps of:

diagnosing faults in the accelerometer; and bypassing the inhibiting step when an accelerometer fault is detected.

10. The invention as defined in claim 6 including the steps of:

commanding accelerometer voltage shifts at power up;

sensing responses to the commanded shifts; and upon failure to detect responses, setting an accelerometer fault and bypassing the inhibiting step.

11. The invention as defined in claim 6 wherein the raw acceleration signal normally has a dc offset, the steps of:

periodically testing the raw acceleration signal for shorts to ground or battery voltage; and when a number of consecutive tests result in a short indication, setting a fault and bypassing the inhibiting step.

* * * * *